May 26, 1953  J. R. ALBRIGHT  2,639,725
PILOT OPERATED RELIEF VALVE FOR PUMPS AND THE LIKE
Filed April 29, 1946  5 Sheets-Sheet 1
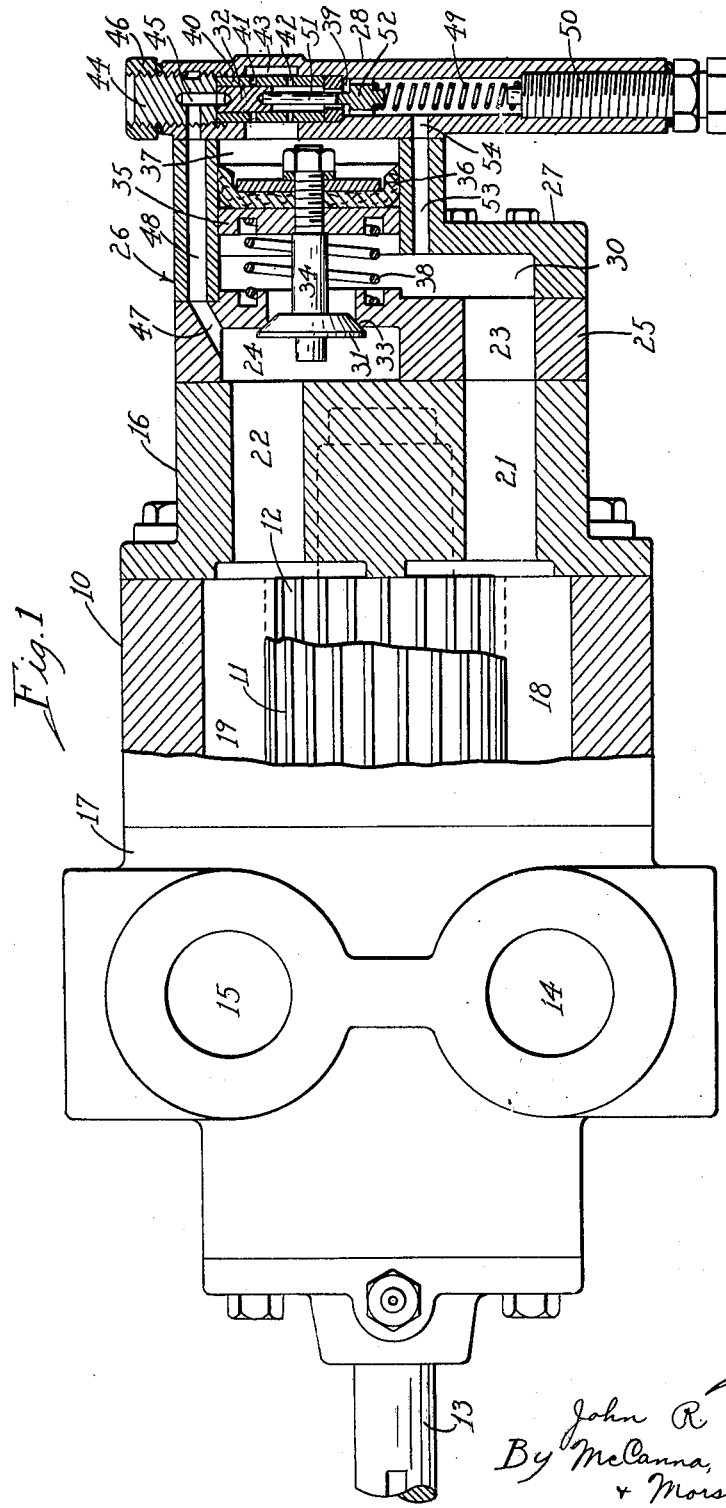
Inventor:
John R. Albright
By McCanna, Wintercorn
& Morsbach Attys.

May 26, 1953          J. R. ALBRIGHT          2,639,725
PILOT OPERATED RELIEF VALVE FOR PUMPS AND THE LIKE
Filed April 29, 1946          5 Sheets-Sheet 2
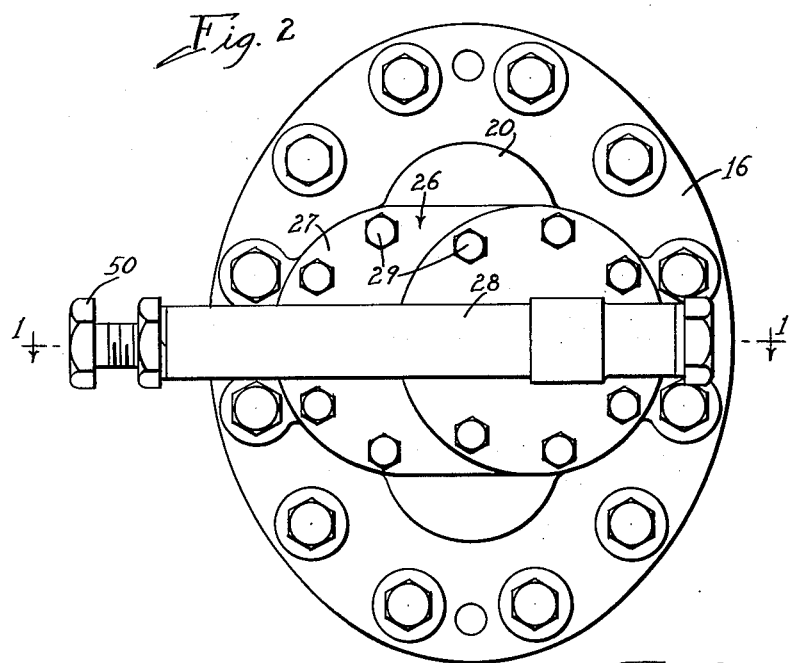
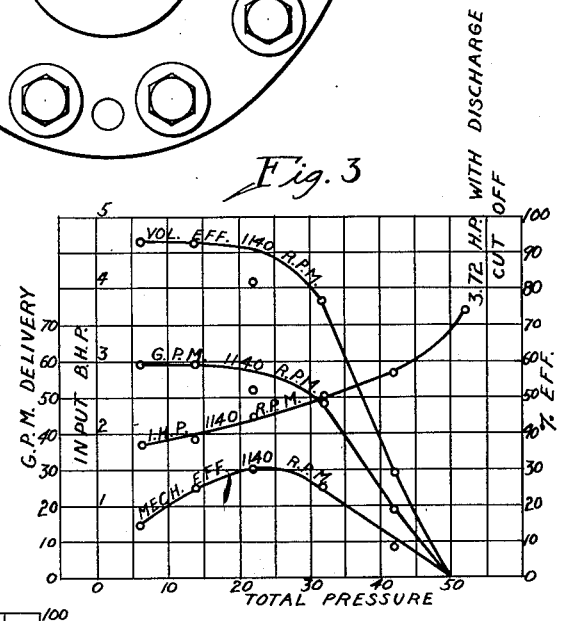
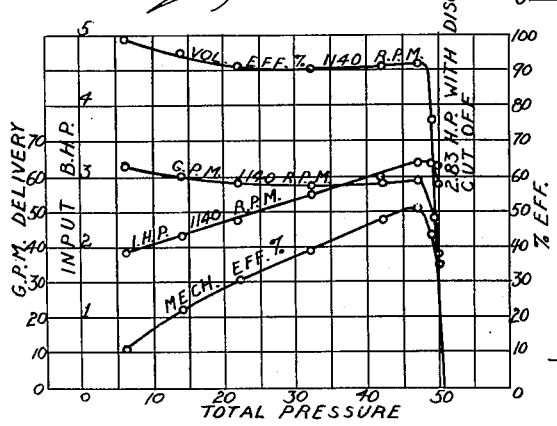
Inventor:
John R. Albright
By McCanna, Wintercorn
& Morsbach
Attys.

May 26, 1953  J. R. ALBRIGHT  2,639,725
PILOT OPERATED RELIEF VALVE FOR PUMPS AND THE LIKE
Filed April 29, 1946  5 Sheets-Sheet 4

Inventor:
John R. Albright
By McCanna and Morsbach
Attys

May 26, 1953        J. R. ALBRIGHT        2,639,725
PILOT OPERATED RELIEF VALVE FOR PUMPS AND THE LIKE
Filed April 29, 1946        5 Sheets-Sheet 5

Inventor:
John R. Albright
By McCanna and Morsbach
attys

Patented May 26, 1953

2,639,725

UNITED STATES PATENT OFFICE 2,639,725

PILOT OPERATED RELIEF VALVE FOR PUMPS AND THE LIKE

John R. Albright, Rockford, Ill., assignor to Geo. D. Roper Corporation, Rockford, Ill., a corporation of Illinois Application April 29, 1946, Serial No. 665,787

12 Claims. (Cl. 137—492)

1

The present invention relates to a pilot operated relief valve for pumps and the like. This application is a continuation in part of my copending application Serial No. 482,706, filed April 12, 1943, now abandoned.

The most common and simplest form of relief valve heretofore used has consisted of a conical valve member held seated against the liquid or other material under pressure by a spring. With such a construction, when the pressure rises to a point above the resistance of the spring, the valve is unseated, allowing the liquid or other material under pressure to escape. With that type of relief valve it is impossible to have a pressure setting where the valve can be fully opened and yet have no leakage past it in the building up of pressure to this point of opening. An approach to such a desideratum would be to have a very large valve and a long heavy spring, but that would be impractical. The simple spring closed pressure relief valve, in other words, cannot have two pressures at which to operate, one at which to open and another lower pressure at which to close. It is, therefore, the principal object of my invention to provide a pilot operated relief valve which eliminates the objections mentioned, by reason of the fact that the pilot valve moves at the critical pressure to control the opening and closing of the relief valve properly.

Broadly, my invention consists in the provision of a novel pilot valve-relief valve combination in which the pilot valve means is provided with high and low pressure passageways connected to the inlet and outlet ports of the relief valve and also provided with at least one movable member that is movable in one direction in response to increase in pressure differential existing between the inlet and outlet ports and movable in the opposite direction by resilient means when the pressure differential between the ports is lowered; the pilot valve means having ports and passageways associated therewith and with a piston or diaphragm connected to the relief valve that:

(a) Normally when the pressure is balanced across the inlet and outlet ports the resilient means will move the movable pilot means to a position where the pressures on both sides of the piston or diaphragm are balanced through a passage in the pilot means whereby a spring associated with a relief valve will close it;

(b) When the pressure differential between the inlet and outlet ports raises to a certain critical point the pilot valve movable means will be moved in response to the pressure differential to a position where the high pressure passageway will communicate with the side of the piston or diaphragm opposite the relief valve so high pressure fluid will be effective to open the relief valve; and (c) When the pressure differential between the inlet and outlet ports is lowered from the above-mentioned critical point to a second critical point the movable means will be moved by the resilient means associated with it to a position where the side of the piston or diaphragm opposite the relief valve will be placed out of communication with the high pressure passageway and into communication with the low pressure passageway to restore the condition of balance across the piston or diaphragm to permit the spring to close the relief valve.

Another important part of my invention as broadly described in the preceding paragraph lies in a construction wherein the critical pressure differentials required to open and to close the relief valve may be preselected so the relief valve may open at any desired critical pressure and close at any desired lower critical pressure. For example, the relief valve may be constructed to open at 100 lbs. differential between the inlet and outlet ports and to close when this differential is lowered to 90 lbs. but by simple changes in construction or rearrangement of parts the relief valve may be set to open at 85 lbs. and close at 80 lbs.

One form of my invention consists in the provision of a piston or plunger type pilot valve slidable in a ported valve bushing to cover and uncover the ports and normally held in a closed position at one end of the bushing by an elongated coiled compression spring seated against an adjustable set screw, the pilot valve serving when the critical pressure is reached to admit fluid under pressure to a cylinder in which a spring returned piston is operable to operate the relief valve. With this combination a wide range of operating characteristics is made available by variation of piston length as compared to distance between ports and by variation in the length of the spring used, bearing in mind the fact that a longer spring's build-up in pressure for a given lineal extent of compression is smaller than a shorter spring's build-up for the same lineal extent of compression. The structure, therefore, permits a set-up in which the relief valve will open at one pressure and remain open until some predetermined lower pressure is reached, according to the operating characteristics desired.

An important feature of my invention as applied to the modification described in the above paragraph consists in the provision of a pilot valve of the kind mentioned in combination with a relief valve and its actuating piston in which the suction or intake chamber is in communication with the cylinder normally on both sides of the piston, one of the ports in the pilot valve bushing affording communication with one end of the cylinder, such communication being, however, cut off when the pilot valve is moved in response to the critical pressure, whereby when fluid under pressure is admitted through another port in the pilot valve bushing to the cylinder the piston is moved mainly by pressure and partly by the suction still active on the other side of the piston, thus opening the relief valve abruptly at the critical pressure.

One aspect of my invention within the broad scope defined above lies in the provision of a pilot valve comprising a stator or casing with high and low pressure passageways connected to the inlet and outlet ports of the relief valve and having a rotor seated within a bore formed in the stator, the rotor having a spring-loaded vane pressed against an inner surface of the stator to separate the high and low pressure passageways. In this modification the stator will have a passage communicating with the side of the relief valve piston or diaphragm opposed to the relief valve and the rotor will have passages formed therein adapted to register with the stator passage at alternate rotative positions to alternately provide communication between the piston and high pressure passageway or the piston and the low pressure passageway whereby the relief valve will be opened in response to a certain predetermined pressure differential between the inlet and outlet ports and be closed in response to a certain lower predetermined pressure differential.

Another aspect of my invention within the broad scope defined above lies in the provision of pilot valve means in combination with a relief valve of the character described in which the pilot valve means includes a pair of cylindrical bores each fitted with a piston, each bore having a high pressure passageway communicating with the inlet side of the relief valve, each having a lower pressure passageway communicating with the outlet side of the relief valve, and each bore having a side opening connected with the end of the relief valve piston (or diaphragm) opposite its spring in this modification, each of the bores will be provided with a spring adapted to resist movement of the pistons in response to increase in pressure in the inlet portion of the relief valve. The pilot pistons will be normally positioned in their respective bores so that one of the bores is normally open and the other is normally closed with respect to the passages leading to the relief valve piston. The normally open piston is provided with a weaker spring or is otherwise more easily moved in response to fluid pressure so that when the pressure in the relief valve inlet rises to a predetermined critical point the normally open piston is first moved to close off the passage to the relief valve piston and then the normally closed piston is opened to permit high pressure fluid to act on the relief valve piston and open it. Then, as pressure is lowered the normally closed piston will shut off communication with the relief valve piston and, at a second critical pressure which is still lower, the normally open piston will place the relief valve piston in communication with the lower pressure passageway to relieve the pressure and allow the relief valve to close.

The invention is illustrated in the accompanying drawings, in which—

Figure 1 is a top view of a gear pump having a portion thereof broken away and shown in horizontal section to illustrate the suction and discharge chambers in the pump and having a pilot operated relief valve made in accordance with my invention applied to the face plate thereof and shown in horizontal section;

Fig. 2 is an end view of the pilot operated relief valve unit;

Figs. 3 and 4 are curves, shown in Fig. 3 the low efficiency of operation of the old spring closed relief valve, and in Fig. 4 the high efficiency of operation obtained with my improved pilot operated relief valve;

Similar reference numerals are applied to corresponding parts throughout the views.

Figure 5:
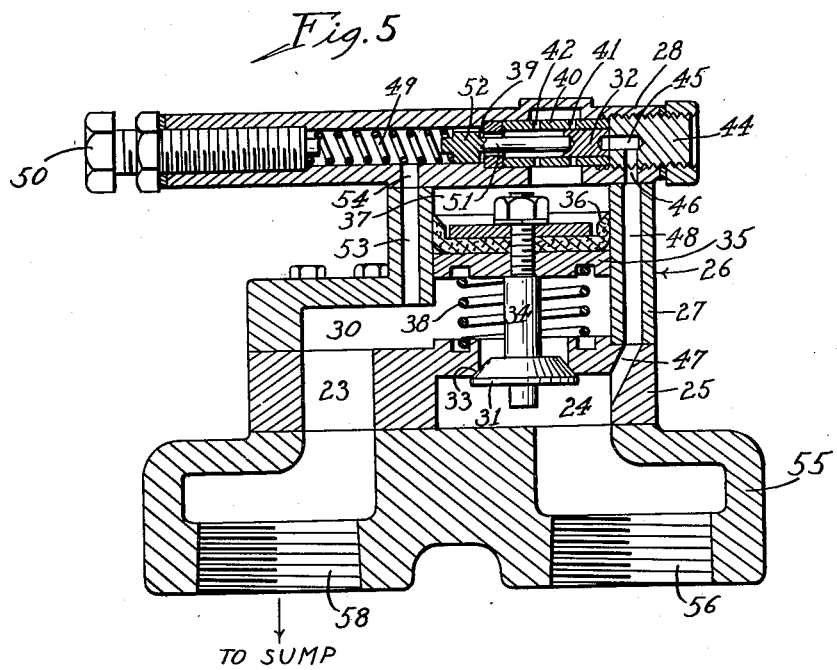
Fig. 5 is a sectional view of another pilot operated relief valve made in accordance with my invention in the form of a separate unit for application to pumps generally.

Referring first to Figs. 1 and 2, the reference numeral 10 designates the body of a rotary gear pump in which intermeshing pumping gears 11 and 12 operate, one of these being driven by the shaft 13 in the conventional manner to pump oil or other material through the suction port 14 from a source of supply and discharge the same through the pressure port 15 to a tank or other suitable receptacle, in which the oil or other liquid may be stored under pressure. The body 10 has face plates 16 and 17 secured onto opposite sides thereof to enclose the pumping gears, and suction and pressure ports 14 and 15 are provided in the face plate 17 and communicate with the suction chamber 18 and discharge chamber 19, respectively, provided in the body on opposite sides of the pumping gears in the usual way.

In accordance with my invention, the face plate 16, which ordinarily is provided only with bearing bosses 20 to receive the trunnions of the pumping gears and suitable bearings therefor, is provided with passages 21 and 22 communicating with the suction and discharge chambers 18 and 19 to connect these chambers with ports 23 and 24 in a plate 25 forming part of my improved pilot operated relief valve, indicated generally by the reference numeral 26. The body of this valve 26 is made in three parts 25, 27, and 28 bolted to the face plate 16, as indicated at 29 in Fig. 2. The middle body part 27 of the valve has a chamber 30 provided therein having holes communicating with the suction chamber 18 through the passage 21 and port 23, but arranged to communicate with the discharge chamber 19 through the port 24 and passage 22 when the conical valve 31 is opened. The conical valve 31 is the relief valve proper, but its opening and closing is under the control of a piston or plunger type pilot valve 32 as will soon appear. The conical valve 31 is reversed from the usual position of the ordinary spring loaded poppet type relief valve, it being disposed with its back toward the pressure chamber, so that the pressure of the oil or other material in the pressure chamber tends to hold it in engagement with the seat 33 provided intermediate the ends of the port 24. The stem 34 of the valve 31 has a guide plate 35 and cup leather piston 36 mounted thereon working in the cylinder 37 in the valve body part 27, and the cylinder 37, it will be noticed, is in open communication at one end with the chamber 30. A coiled compression spring 38 encircles the stem 34 and is seated on the valve body part 25 at one end and on the guide plate 35 at its other end to assist in holding the valve 31 closed. The valve body part 28 has a longitudinal bore 39 provided therein in which the pilot valve 32 operates, the valve 32 being reciprocable inside a bushing 40 inserted in the bore 39 to cover and uncover radial ports 41 and 42 provided in the wall of the bushing in longitudinally spaced relation. The ports 41 and 42 communicate with a chamber 43 in the valve body part 28 that is in open communication with the adjacent end of the cylinder 37. A screw plug 44 holds the bushing 40 in place in the bore 39 and has a right angle passage 45 provided therein communicating with a radial passage in the valve body part 28 and communicating passages 47 and 48 in the valve body parts 25 and 27, whereby to establish communication between the discharge chamber 19 and one end of the bushing 40 so that the pilot valve 32 in said bushing will move in response to changes in pressure in the discharge chamber 19 and against the resistance of an elongated coiled compression spring 49 of small diameter, the compression of which is adjustable by means of a screw 50 threaded in the end of the bore 39 and forming a closure therefor. A packing nut 46 threaded on the plug 44 compresses a gasket to prevent leakage along the plug. A push rod 51 is affixed to the pilot valve 32 to transmit pressure of the spring 49 thereto, and this push rod has a spider portion 52 thereon to guide it in the bore 39. A passage 53 in the valve body part 27 communicates with the bore 39 through a passage 54 in the valve body part 28 and establishes communication between the suction chamber 18 and the bushing 40, so that the pilot valve 32 is at all times subject to the pressure differential between the chambers 18 and 19. The suction chamber 18 has communication normally with both ends of the cylinder 37, and the reduction in pressure is, therefore, normally balanced on opposite sides of the piston 36 but helps to keep the relief valve 31 closed tight. However, when the pilot valve 32 moves in response to critical pressure, closing ports 42 and uncovering ports 41, the reduction in pressure in the suction chamber 18 is active only on the inner side of the piston 36, whereas pressure from the discharge chamber 19 is active on the outer side, and, hence, the suction, in the case of a low pressure pump particularly, is a more or less important factor in causing abrupt opening of the relief valve, the piston 36 being sufficiently larger in diameter than the relief valve 31 to make the reduction in pressure active on the piston such a factor. The reduction in pressure is, furthermore, active against the inner end of the pilot valve 32 to help move the same in response to rise in pressure active against the outer end, and, of course, this is also of importance in the case of a low pressure pump particularly. In fact, the relief valve structure by reason of this novel arrangement of the relief valve proper, its actuating piston, and the pilot valve controlling the operation of the piston is usable to advantage where there is no pressure in the discharge chamber and a reduction in pressure in the suction chamber, as, for example, in the case of a vacuum pump. The spring 49 under normal conditions serves to maintain a balanced condition, holding the pilot valve 32 in the forward position shown, covering only the ports 41 and leaving the outer end of the cylinder 37 in communication with the suction chamber 18. While the movable pressure responsive driving member for the relief valve is here shown as a piston mounted in the cylinder 37, it will be obvious that a diaphragm will operate similarly and may be preferred for certain applications of the invention.

In operation, the conical relief valve 31 is held closed partly by action of the spring 38 and partly by the pressure of the oil or other material in the discharge chamber 19. There will be no leakage past this valve until an external force acts on it to open it against the spring pressure and hydraulic pressure holding it closed. The pilot valve 32 under normal conditions cuts off communication between the discharge chamber 19 and the outer end of the cylinder 37, while allowing open communication between said cylinder and the suction chamber 18. However, as soon as the critical pressure for which the spring 49 has been adjusted is exceeded, the pilot valve 32 moves in response to the increase in pressure, closing the ports 42, and uncovering the ports 41, thereby allowing oil or other material under the pressure existing in the discharge chamber 19 to enter the outer end of the cylinder 37 to act on the piston 36. This piston has a larger area than the valve 31 and under the conditions stated will open the valve against the pressure which theretofore tended to hold it closed. When the valve 31 is opened in this way, oil or other material is, of course, by-passed from the discharge chamber 19 back to the suction chamber 18 and any further build-up in pressure is accordingly prevented. When the pressure drops to a point where the pilot valve 32 can return to its initial position, closing the ports 41 and opening the ports 42, the valve 31 will close immediately, by reason of the relief in pressure in the outer end of the cylinder 37 and the closing action of the spring 38 plus the hydraulic pressure acting on the valve 31. The difference between the opening and closing pressure can be varied by changing the length of the pilot valve 32 or the distance between the two sets of ports 41 and 42, or by using a shorter or longer spring 49. An important advantage in this pilot operated relief valve over the old spring loaded relief valve is that it can be set to open at a definite pressure and at this pressure it will open completely without any previous leakage past the valve in the building up in pressure to the critical point, and in the closing of the valve the action is similar in that the valve will remain fully opened until the pressure has dropped to a point where the valve will close. With this arrangement it is possible to have an opening pressure that is higher than the closing pressure, and that is often desirable where a relief valve is used in a hydraulic system. When the releasing pressure has been reached, the valve will remain completely open until the pressure drops to its closing point. This permits the pump to start pumping again at a low pressure and there is avoided the objection of placing a sudden heavy load on the motor or other drive means. Another advantage of this construction is the fact that the relief valve does not "hunt" so much and does not batter its seat by too many closings, because where the valve is set to open at, say, one hundred pounds, it will stay open until the lower pressure for which it is to set to close is reached.

With the present arrangement it is also possible to have the opening and closure pressure practically the same—the device is that sensitive. The curves of Figs. 3 and 4 serve to illustrate graphically the advantages of my invention, and it will be noted in Fig. 3 that with the old spring loaded relief valve the volumetric efficiency drops off rapidly beyond the thirty pound pressure point, whereas with my invention, as illustrated in Fig. 4, the volumetric efficiency remains substantially the same up to approximately forty-seven pounds before the drop occurs and the drop is abrupt. It is interesting further to note that whereas 3.72 horsepower is consumed with the old spring loaded relief valve with the discharge cut off, there is only 2.83 horsepower consumed under similar conditions with my invention. The curves showing gallons per minute and mechanical efficiency are in contrast in the two figures in favor of the present invention, similarly as the curves showing volumetric efficiency.

Figure 6:
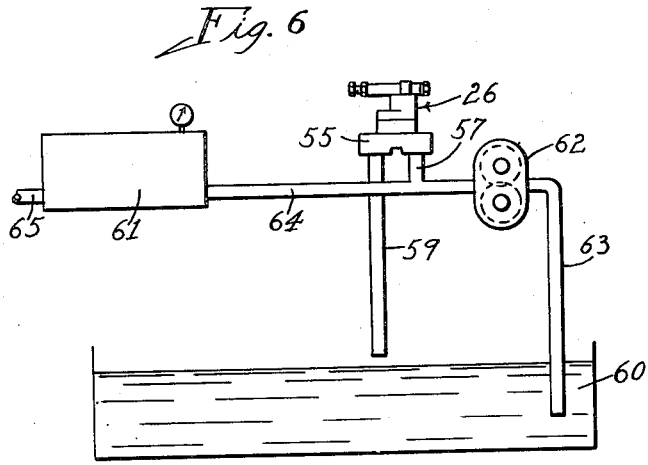
Fig. 6 is a diagram illustrating the manner of application of the unit shown in Fig. 5.

The relief valve unit shown in Fig. 5 is similar to the valve of Fig. 1, but in this unit the valve body part 55 is attached to the valve body parts 25, 27, and 28, and it has a threaded opening 56 to receive a pipe 57, as shown in Fig. 6, communicating with the discharge side of a pump, and has another threaded opening 58 to receive a drain pipe 59 extending to the sump 60 of a hydraulic system, as shown in Fig. 6. In that figure a pressure storage tank 61 is illustrated as the receptacle into which fluid is discharged from the pump 62, 63 being the intake pipe for the pump and 64 its discharge pipe. The pipe indicated at 65 extending from the pressure storage tank may be extended to a hydraulic device, for example, which is arranged to be operated by oil or other fluid under pressure. It is therefore clear that with the construction shown in Fig. 5 the invention is made universally applicable, and there is the further advantage that the oil or other material being handled is not circulated in the pump itself, causing wear and tear on the pumping gears and objectionable rise in temperature of the working fluid.

Figure 7:
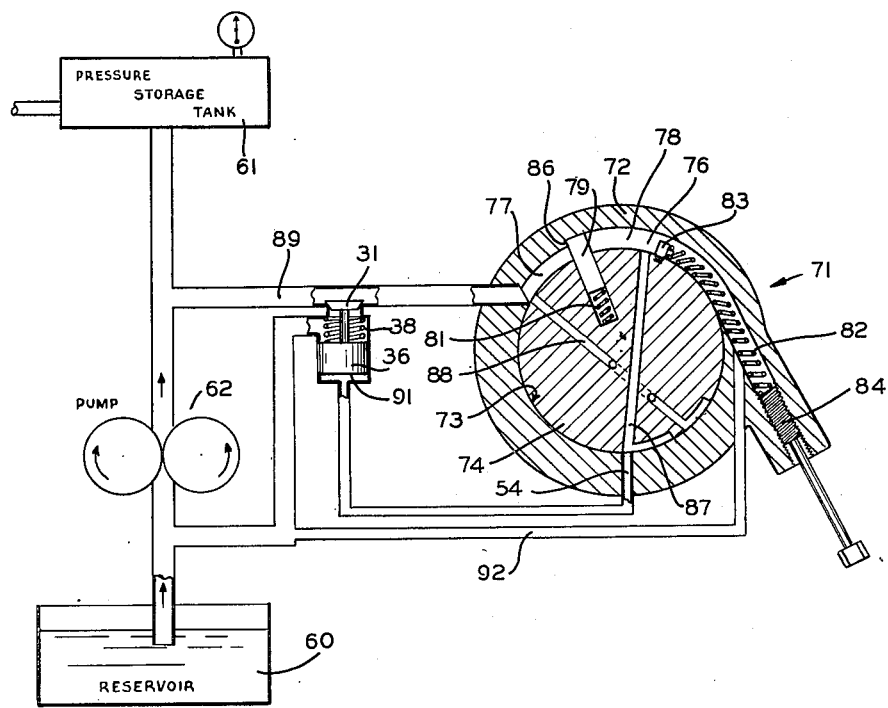
Fig. 7 is a diagrammaic view of another modification of my invention.

Another modification of my invention is shown diagrammatically in Fig. 7. The pilot valve generally designated 71 comprises a housing or stator 72 having a cylindrical bore 73 with a rotor 74 seated therein. The bore 73 is enlarged at 76 for a portion of its circumference, the enlargement being divided into a high pressure side 77 and the lower pressure side 78 by means of the vane 79 which is loaded by the spring 81. A coiled spring or resilient member 82 is seated at one end upon the spud 83 attached to the rotor and at the other end it is seated upon the adjusting screw 84. The coiled spring is provided to urge the rotor counterclockwise so that normally, when there are no pressure forces counteracting the spring 82, the vane 79 will be pressed against the housing surface 86. The housing surface 86 serves as a stop to limit counterclockwise rotation at a position where the L-shaped rotor passage 87 registers with the stator passage 54 to provide communication between the head end of the piston 36 and the lower pressure side 78 of the vane. The compression of the spring 82 will be adjusted by the screw 84 so that at the desired critical pump outlet pressure the rotor will be turned clockwise to the extent that the L-shaped rotor passageway 88 registers with the stator passageway 54 to admit high pressure fluid into the head end of the piston and open the relief valve 31.

Describing now the operation of the modification shown in Fig. 7 the conical relief valve 31 is held closed partly by action of the spring 38 and partly by the hydraulic fluid pressure in the relief valve inlet 89. The pilot valve 71, under normal conditions as shown in Fig. 7, cuts off communication between the discharge side of the pump 62 and the head end 91 of the piston 36, while allowing communication between said head end and the low pressure side or passageway 78. However, as soon as the critical pressure for which the spring 82 has been adjusted is exceeded, the pilot rotor 74 moves clockwise in response to the pressure differential across the vane 79 to place passage 88 instead of passage 87 in registration with the housing passage 54, thereby allowing high pressure fluid in the high pressure passageway 77 to be operative upon the head end 91 of the relief valve piston to open the relief valve. Fluid will then be by-passed directly from the pump outlet to be inlet and any further build-up in pressure is accordingly prevented. When the pressure drops to a point where the rotor 74 can return to its initial or Fig. 7 position to place passageway 87 once more in registration with the stator passage 54 the valve 31 will close immediately, because the head end of the piston 36 is connected with the low pressure side of the pump through the conduit 92. As in the previous modifications the difference between the opening and closing pressures can be varied by changing the spacing between the ends of the rotor passages 87 and 88 which register with the stator passage 54, or by changing the position or size of the stator passage 54, or by using a shorter or longer spring 82.

Figure 8:
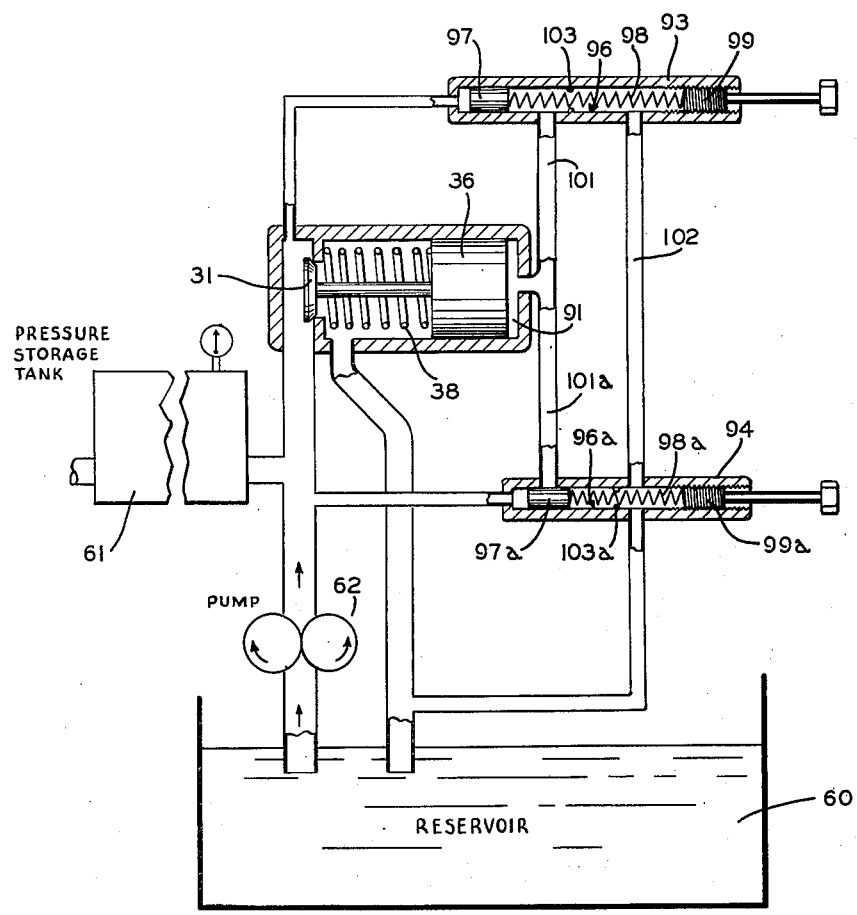
Fig. 8 is another diagrammatic view showing a still further modification of my invention.

A still further modification of my invention is shown also diagrammatically in Fig. 8. In this instance, the pilot valve, equivalent to that designated 32 in the Figs. 1 and 5 modifications, comprises a pair of pilot valves 93 and 94 which are operable in response to different fluid pressures to control the opening and closing of the relief valve 31 so that at a preselected pressure, fluid will be by-passed from the pump 62 directly into the reservoir 60 instead of into the storage tank 61. The relief valve 31 and the piston 36 associated with it is identical to that shown in the previous figures. The pilot valves comprise cylindrical bores 96 and 96a which may be in separate members as shown or may be formed in the same housing as the relief valve 31 whichever is desired. The valve bores 96 and 96a will have reciprocably fitted therein the pistons 97 and 97a which are urged to the normal or Fig. 8 positions by the springs 98 and 98a, the compression of the springs being adjustable by means of the screws 99 and 99a. The piston 97 will normally be pressed beyond the passage 101 whereby the head end of the relief valve piston 36 will be in direct communication with the outlet side of the relief valve through the line 102. Discharge pressure of the pump 62 will be operative to move the piston 97 backward against the stop 103 where it will close off the passage 101 and to move the piston 97a backward against the stop 103a where it will open the passage 101a for the entrance of high pressure fluid from the pump. The relative size of the pilot pistons will be so made or the relative compression of their adjusting springs will be such that the pilot piston 97 will be moved to cover the passage 101 at a lower pressure than required to move the piston 97a to uncover the passage 101a. Conversely, when the pressure is lowered, the passage 101a will first be closed (to place the head end 91 of the piston out of communication with the discharge side of the pump), then, at a somewhat lower critical pressure preselected by the load on the spring 98, the passage 101 will be opened (to place the head end 91 of the piston in communication with the low pressure outlet side of the valve 31) whereby the pressure across the piston 36 will be balanced and the relief valve 31 will be closed by the action of the spring 38.

Describing now the operation of the modification shown in Fig. 8, the parts are illustrated in their normal or non-pumping positions, with the head end of the piston communicating only with the outlet or low pressure side of the relief valve as above described. However, as soon as the pump discharge pressure is built up to a certain value, say 88 pounds, determined by the setting of spring 98, the piston 97 will be moved to cover the passage 101 and place the relief valve piston 36 out of communication with the relief valve outlet port. Then, as the pressure continues to build up to a certain higher critical pressure, say 90 pounds, preselected by the setting of spring 98a, the piston 97a will be moved to uncover the passage 101a to place the piston 36 in communication with the pump pressure existing in the inlet side of the relief valve. This will cause the relief valve 31 to be opened in response to the pressure differential across the piston 36 and relieve the pressure in the pump discharge line by by-passing fluid to the reservoir. When the pump discharge pressure is lowered to a certain critical pressure, say 80 pounds, the passage 101a will be covered by piston 97a and the passage 101 will be uncovered by the piston 97 to permit the piston 36 to close the relief valve 31 under the action of the spring 38.

It is believed the foregoing description conveys a good understanding of the objects and advantages of my invention. The appended claims have been drawn to cover all legitimate modifications and adaptations.

I claim:

1. In a relief valve of the character described, the combination of a body or support in which are high and low pressure passages subject to appreciable difference in pressures, an unbalanced piston valve arranged between said passages, the piston being of larger diameter than the valve and being mechanically connected directly with the valve to open the same against the pressure in the high pressure passage when it increases above a predetermined amount, spring means tending to move the valve toward closed position, a cylinder for said piston, a pilot valve cylinder having longitudinally spaced ports communicating with the piston cylinder at the side of the piston remote from the valve to which it is connected and at its opposite ends communicating with the high and low pressure passages respectively, and a spring pressed plunger in the pilot valve cylinder of a length greater than the distance between the spaced ports, said pilot valve plunger being spring pressed in one direction to close the port between the piston cylinder and the high pressure passage and movable in the opposite direction in response to increase in pressure in said high pressure passage to open the piston cylinder to pressure in the high pressure passage when it exceeds said predetermined amount, said pilot valve plunger being movable in the first mentioned direction in response to decrease in pressure in the high pressure passage to first close both of said ports and thereafter open the port between the piston cylinder and the low pressure passage to provide communication between the piston cylinder and the low pressure passage.

2. In a relief valve, the combination of a body in which are low pressure and high pressure passages, an unbalanced piston valve arranged between said passages, the piston being of larger diameter than the valve and being mechanically connected with the valve to open the same against high pressure in the high pressure passage when the high pressure increases above a predetermined value, said piston having both sides thereof normally in open communication with the low pressure passage, a pilot valve cylinder in communication at one end with the high pressure passage and at the opposite end with the low pressure passage, said cylinder having between said opposite ends longitudinally spaced ports in the wall thereof communicating with the outer side of said piston opposite from its valve, a spring pressed pilot valve plunger reciprocable in said cylinder and having a length greater than the distance between the spaced ports movable in one direction under spring pressure to cut off one of said ports and close communication between the high pressure passage and said outer side of said piston, said pilot valve being movable in the opposite direction against said spring pressure in response to increase in said high pressure above said predetermined value to cut off the other of said ports and thereby close communication between said outer side of the piston and the low pressure passage and open communication between said outer side of the piston and said high pressure passage when the high pressure exceeds said predetermined value, said plunger moving in the said one direction in response to decrease in the high pressure to first close said one of said ports and thereafter open said other of said ports to thereby effect communication between said outer side of the piston and the low pressure passage at a preselected reduced high pressure, and whereby the pilot valve plunger is also subject to the reduction in pressure in the low pressure passage at one end in addition to being subject to high pressure active on its opposite end.

3. A relief device comprising a body having an inlet port and an outlet port, a main valve element controlling flow between said ports, said valve element having a piston adapted to be in communication on one side with the outlet port, said piston being of larger diameter than said valve element and mounted for reciprocation in a bore in said body, spring means at said one side of said piston urging said valve element toward closed position, a pilot valve cylinder having communication at its ends with said inlet and outlet ports respectively, said cylinder having longitudinally spaced apertures through the wall thereof and communicating with the piston bore on the side of the piston opposite the spring, a pilot valve plunger reciprocably mounted in said cylinder and having a length greater than the distance between the spaced apertures, a spring for urging said plunger toward one end of the cylinder to close communication between the inlet port and the adjacent one of said apertures, said plunger being movable against said second mentioned spring upon a predetermined increase in inlet pressure to open communication between the inlet port and said adjacent one of the apertures and to close the other aperture whereby inlet pressure fluid enters said piston bore to more the piston to open the main valve element, and said plunger being movable upon a predetermined decrease in inlet pressure to first close said adjacent aperture and thereafter open the other aperture to provide communication between the piston bore and the outlet port whereupon the main valve will be returned to closed position.

4. A relief device comprising, in combination, a body having high pressure and low pressure passages, a main valve element controlling flow between said passages, said valve element having a piston adapted to be exposed on one side to the low pressure passage, a cylinder in which said piston is reciprocable, said piston being of larger diameter than said valve element, spring means urging said valve element toward closed position, a pilot valve cylinder having communication at its ends with said high pressure and low pressure passages, respectively, said pilot valve cylinder having longitudinally spaced ports through the wall thereof communicating with the piston cylinder at the opposite side of said piston, a pilot valve plunger reciprocably mounted in said pilot valve cylinder and having a length greater than the distance between said spaced ports, a spring for urging said pilot valve plunger toward one end of its cylinder to close communication between the high pressure passage and the adjacent one of said ports, said pilot valve plunger being movable against said second mentioned spring upon a predetermined increase in the pressure differential between the high pressure and the low pressure passages to open communication between the high pressure passage and said adjacent one of said ports and to close the other port whereby high pressure fluid enters said piston cylinder at said opposite side of the piston to move the piston to open the main valve element, and said pilot valve plunger being movable upon a predetermined decrease in the pressure differential between the high pressure and the low pressure passages to first close said adjacent port and thereafter open the other port to provide communication between the piston cylinder at said opposite side of the piston and said low pressure passage whereupon the main valve will be returned to closed position.

5. A relief device comprising, in combination, a body having high pressure and low pressure passages, a main valve element controlling flow between said passages, said valve element having a piston adapted to be exposed on one side to the low pressure passage, a cylinder in which said piston is reciprocable, said piston being of larger diameter than said valve element, a pilot valve cylinder having communication at its ends with said high pressure and low pressure passages, respectively, said pilot valve cylinder having longitudinally spaced ports through the wall thereof communicating with the piston cylinder on the opposite side of said piston, a pilot valve plunger reciprocable in said pilot valve cylinder and having a length greater than the distance between said spaced ports, means for urging said pilot valve plunger toward one end of its cylinder to close communication between the high pressure passage and the adjacent one of said ports, said pilot valve plunger being movable in the opposite direction upon a predetermined pressure differential between the high pressure passage and the low pressure passage to open communication between the high pressure passage and the said adjacent one of said ports and to close the other port whereby high pressure fluid enters said piston cylinder at said opposite side of the piston to move the piston to open the main valve element, and said plunger being movable toward the first mentioned end of its cylinder upon a predetermined decrease in the pressure differential between the high and the low pressure passages to close said adjacent port and open the other port to provide communication between the piston cylinder at said opposite side of the piston and said low pressure passage, whereby the main valve will be returned to the closed position.

6. A relief device comprising, in combination, a body having high pressure aand low pressure passages, a main valve element disposed between said passages to control the flow therebetween, said valve element being directly mechanically connected to a piston, a cylinder in which said piston is reciprocable having its end at the side of the piston adjacent the main valve communicating with the low pressure passage, said piston being of larger diameter than said valve element, spring means urging said valve toward closed position, pilot valve means operably associated with said body and having a stator with high and low pressure sides communicating with said body high and low pressure passages, said stator having a cylindrical bore therein with a rotor fittably engaging said bore, said bore and said rotor having substantial clearance therebetween for a portion of their circumferences, said rotor having a spring-loaded vane pressed into substantially pressure sealing engagement with said stator in said clearance portion, said vane being swingable with said rotor while remaining in fluid-sealing contact with said stator and serving to separate said stator high and low pressure sides, said stator having a passage communicating with the opposite end of the piston cylinder, said rotor having a pair of passages formed therein, one end of each of said rotor passages communicating respectively with the high and low pressure sides of said stator, and the opposite ends of said rotor passages selectively registrable with said stator passage at preselected positions of said rotor, pressure differential across said vane being operative when the pressure differential between said body high and low pressure passages exceeds a predetermined amount to move said rotor in one direction to one extreme position to place said stator high pressure side in communication with said opposite end of the piston cylinder to move the piston to unseat said valve element and to block communication between said stator low pressure side and said opposite end of the piston cylinder, resilient means associated with said rotor urging it to move in the opposite direction to its opposite extreme position to place said stator low pressure side in communication with said opposite end of the piston cylinder to balance the pressure thereacross to cause said valve element to be closed by said spring, said rotor being operative when the pressure differential between said body high and low pressure passages is at a preselected value below said predetermined amount to be moved by said resilient means in said opposite direction to said opposite extreme position to place said stator low pressure side in communication with said opposite end of the piston cylinder and to block communication between said stator high pressure side and said opposite end of the piston cylinder to balance the pressure across the piston and permit said spring means to seat said main valve, and said rotor being operative in an intermediate position between its extreme positions to block both said stator high pressure and low pressure sides from communication with said opposite end of the piston cylinder.

7. A relief device comprising, in combination, a body having high pressure and low pressure passages, a main valve disposed between said passages to control the flow therebetween, said main valve being operatively connected to a movable pressure responsive driving member operative to open the main valve against the pressure in the high pressure passage when the pressure differential between the high and low pressure passages exceeds a predetermined amount, said driving member being of larger cross-sectional area than said main valve, spring means associated with said driving means urging said main valve toward closed position, means defining a chamber for said driving member having one end at one side of said driving member in fluid communication with said low pressure passage, pilot valve means operably associated with said body and having a stator with high and low pressure sides communicating with said body high and low pressure passages, said stator having a cylindrical bore therein with a rotor fittably engaging said bore, said bore and said rotor having substantial clearance therebetween for a portion of their circumferences, said rotor having a radial vane urged into substantially pressure sealing engagement with said stator at said clearance portion, said vane being swingable with said rotor while remaining in fluid-sealing contact with said stator and serving to separate said high and low pressure sides, said stator having a passage communicating with the opposite end of said chamber at the opposite side of said driving member, said rotor having a pair of passages, one end of each of said rotor passages communicating respectively with the high and low pressure sides of said stator and the opposite ends of said rotor passages being registrable selectively with said stator passage at preselected positions of said rotor, pressure differential across said vane being operative when the pressure differential between said high and low pressure passages exceeds a predetermined amount to move said rotor to an extreme position in one direction to place said high pressure side in communication with said opposite side of the driving member to move the driving member to unseat said main valve and to block communication between said stator low pressure side and said opposite side of the driving member, resilient means associated with said rotor urging it to move in the opposite direction to its opposite extreme position to place said low pressure side in communication with said opposite side of the driving member to balance the pressure thereacross to cause said main valve to be seated by said spring means, said rotor being operative when the pressure differential between said body high and low pressure passages is at a preselected value below said predetermined amount to be moved by said resilient means in said opposite direction to said opposite extreme position to place said stator low pressure side in communication with said opposite side of the driving member and to block communication between said stator high pressure side and said opposite side of the driving member to balance the pressure across the driving member and permit said spring means to close the main valve, and said rotor being operative in an intermediate position between its extreme positions to block both said stator high pressure and low pressure sides from communication with said opposite side of the driving member.

8. A relief device comprising, in combination, a body having high pressure and low pressure passages, a main valve disposed between said passages to control the flow therebetween, said valve being directly mechanically connected to a cylinder in which said piston is reciprocable having its end at the side of the piston adjacent the main valve communicating with the low pressure passage, said piston being of larger diameter than said valve, spring means urging said valve toward closed position; pilot valve means having a pair of cylindrical bores the ends of which communicate respectively with said high and low pressure passages, each of said bores having an intermediate aperture communicating with the opposite end of the piston cylinder at the opposite side of the piston, each of said bores having a pilot piston therein urged by respective resilient means in a direction to resist movement of said pilot pistons in response to pressure differential existing between said high and low pressure passages, one of said pilot pistons being normally pressed by its resilient means to a position beyond the intermediate aperture of its bore in a direction toward the high pressure end of its bore to place said opposite end of the main valve piston cylinder in communication with the low pressure passage and to block said opposite end of the main valve piston cylinder from communication with said high pressure passage, the other of said pilot pistons being normally urged by its resilient means in a direction toward the high pressure end of its bore to a position to cover the intermediate aperture of its bore to close off communication between said high pressure passage and said opposite end of the main valve piston cylinder, said one pilot piston being more readily movable than said other pilot piston in response to the pressure differential between said high and low pressure passages whereby when the pressure differential between said high and low pressure passages rises to a critical value determined by one of said resilient means said one pilot piston is first moved against the force of said one resilient means toward the low pressure end of its bore in response to said pressure differential to cover the intermediate aperture of its bore to shut off communication between said opposite end of the main valve piston cylinder and said low pressure passage while said other pilot piston covers the intermediate aperture of its bore and then when the pressure differential between said high and said low pressure passages rises to a higher critical value determined by the other of said resilient means said other piston is moved against the force of said other resilient means toward the low pressure end of its bore to uncover the intermediate aperture of its bore to place said opposite end of the main valve piston cylinder in communication with said high pressure passage to move said main valve piston to effect the opening of said valve.

9. A relief device comprising, in combination, a body having high pressure and low pressure passages, a valve element disposed between said passages to control the flow therebetween, said valve element being operatively connected to a movable pressure responsive driving member operative to open the valve element against the pressure in the high pressure passage when the pressure differential between the high and low pressure passages exceeds a predetermined amount, said driving member being of larger cross-sectional area than said valve element, spring means associated with said driving member for biasing the valve element to a closed position, means defining a chamber for said driving member having one end at one side of said driving member in fluid communication with said low pressure passage, pilot valve means having a pair of cylindrical bores the ends of which communicates respectively with said high and low pressure passages, each of said bores having an intermediate opening communicating with the opposite end of said chamber at the opposite side of said driving member, each of said bores having a pilot piston therein urged by respective resilient means in a direction to resist movement of said pilot pistons in response to pressure differential existing between said high and low pressure passages, one of said pilot pistons being normally pressed by its resilient means to a position in a direction toward the high pressure end of its bore beyond the intermediate opening of its bore to place said opposite end of the driving member in communication with the low pressure passage, the other of said pilot pistons being normally urged by its resilient means in a direction toward the high pressure end of its bore to a position to cover the intermediate opening of its bore to close off communication between said high pressure passage and said opposite end of the driving member, said one pilot piston being more readily movable than said other pilot piston in response to the pressure differential between said high and low pressure passages whereby when the pressure differential between said high and low pressure passages rises to a critical value determined by one of said resilient means said one pilot piston is first moved across the force of said one resilient means toward the low pressure end of its bore in response to said pressure differential to cover the intermediate opening of its bore to shut off communication between said opposite end of the driving member and said low pressure passage while said other pilot piston covers the intermediate aperture of its bore and then when the pressure differential between said high and said low pressure passages rises to a higher critical value determined by the other of said resilient means said other piston is moved against the force of said other resilient means toward the low pressure end of its bore to uncover the intermediate opening of its bore to place said opposite end of the driving member in communication with said high pressure passage to move said driving member in a direction to effect the opening of said valve element.

10. In a relief valve for use with a pressure fluid system, the combination of a body having passages for connection to high and low pressure fluid sources, an unbalanced piston valve arranged between said passages, the piston being of larger diameter than the valve and being mechanically connected directly with the valve to open the same against the pressure in the high pressure source when it increases above a predetermined amount, spring means tending to move the valve toward closed position, a cylinder for said piston having its end at the side of the piston adjacent the valve communicating with the low pressure source, pilot valve body means, means providing communication between said pilot valve body means and the opposite end of said cylinder and between said pilot valve body means and the high and low pressure sources respectively, and movable valve means in direct communication with both the high and low pressure sources and movable in said pilot valve body means between preselected positions in response to preselected pressures existing at said high and low pressure passages for controlling the admission and discharge of pressure fluid to and from said opposite end of the cylinder, said movable valve means being movable in one direction when the pressure in the high pressure source exceeds said predetermined amount, and resilient means for moving the movable valve means in the opposite direction when the pressure in the high pressure source is at a preselected value below said preselected amount, said movable valve means in one extreme position being positioned to block communication between said opposite end of the cylinder and the low pressure source and to open communication between said opposite end of the cylinder and the high pressure source to move the piston to move the connected valve to an open position, said movable valve means in its other extreme position being positioned to block communication between said opposite end of the cylinder and the high pressure source and to open communication between said opposite end of the cylinder and the low pressure source whereby the spring means moves the valve to its closed position, and said movable valve means in an intermediate position thereof being positioned to simultaneously block communication between said opposite end of the cylinder and both the high pressure source and the low pressure source.

11. In a relief valve for use in a pressure fluid system, the combination of a body having first and second ports for connection to a high and low pressure source respectively, a main valve element movable between open and closed positions for controlling the flow of fluid between said ports, a chamber containing a movable wall directly connected to said valve element and having its side adjacent the valve element exposed to the low pressure source, said movable wall having a larger cross-sectional area than said valve element, first spring means tending to move the valve element toward a closed position, pilot valve body means, means providing communication between said pilot valve body means and said chamber at the opposite side of said movable wall and between said pilot valve body means and the first and second ports respectively, movable means in direct communication with the first and second ports movable in said pilot valve body means between preselected positions for controlling the admission and discharge of pressure fluid to and from the chamber at said opposite side of said movable wall through said ports, said movable means being movable in one direction when the pressure thereon exceeds said predetermined amount, and adjustable second spring means, accessible from the exterior of the pilot valve body means, for moving the movable means in the opposite direction when the pressure on the movable means is below said preselected amount, said movable means in one extreme position being positioned to effect communication between the first port and the chamber at said opposite side of said movable wall to move the main valve element to an open position and to block communication between the second port and the chamber at said opposite side of the movable wall and in its other extreme position being positioned to block communication between the first port and the chamber at said opposite side of said movable wall and to open communication between the chamber at said opposite side of said movable wall and the second port, whereby the second spring means moves the main valve element to its closed position, and in an intermediate position being positioned to block communication between the chamber at said opposite side of said movable wall and both the first and second ports.

12. In a relief valve for use with a pressure fluid system, the combination of a body having a high pressure passage and a low pressure passage for connection respectively to high and low pressure fluid sources, a main valve arranged between said passages, a movable member having a larger cross-sectional area than the main valve operatively connected to the main valve to open the same against the pressure in the high pressure passage when the pressure differential between the high and low pressure passages exceeds a predetermined amount, spring means biasing the main valve toward closed position, means defining a chamber for said movable member having one end at one side of said movable member in fluid communication with one of said passages leading to one side of the main valve to effect communication between the corresponding fluid source and both said one side of the main valve and said one side of the movable member in said chamber, pilot valve body means, means providing fluid communication between said pilot valve body means and the opposite end of the chamber and between said pilot valve body means and the high and low fluid pressure sources respectively, movable valve means in direct communication with both the high and low pressure sources and movable thereby in said pilot valve body means between preselected positions in response to preselected pressure differentials between said high and low pressure sources for controlling the admission and discharge of pressure fluid to and from said opposite end of the chamber, said movable valve means being movable in one direction when the pressure differential between said high and low pressure sources exceeds a predetermined amount, and resilient means for moving said movable valve means in the opposite direction when the pressure differential between the high and low pressure sources is at a preselected value below said predetermined amount, said movable valve means in one extreme position thereof being positioned to block said opposite end of the chamber from communication with the fluid source which is in communication with said one end of the chamber and being positioned to open communication between said opposite end of the chamber and the other fluid source whereby the resulting fluid pressure unbalance in the chamber on opposite sides of the movable member displaces the movable member to move the main valve to an open position, said movable valve means in the other extreme position thereof being positioned to block communication between said opposite end of the chamber and said other fluid source and to open communication between said opposite end of the chamber and the fluid source which communicates with said one end of the chamber whereby the pressure at opposite sides of the movable member is balanced and the spring means moves the valve to its closed position, and said movable valve means in an intermediate position thereof between said extreme positions being positioned to block both fluid sources from communication with said opposite end of the chamber.

JOHN R. ALBRIGHT.

References Cited in the file of this patent

UNITED STATES PATENTS

| Number | Name | Date |
|---|---|---|
| 1,056,562 | Lombard | Mar. 18, 1913 |
| 1,110,320 | Fulton | Sept. 15, 1914 |
| 2,375,410 | Gondek | May 8, 1945 |

FOREIGN PATENTS

| Number | Country | Date |
|---|---|---|
| 26,746 | Netherlands | Dec. 15, 1932 |